US006764002B1

(12) United States Patent
Zimmerman et al.

(10) Patent No.: US 6,764,002 B1
(45) Date of Patent: Jul. 20, 2004

(54) SYSTEM AND METHOD OF DISPLAYING RANDOM WEIGHT ITEM INFORMATION BY ELECTRONIC PRICE LABELS

(75) Inventors: Terry L. Zimmerman, Lawrenceville, GA (US); Raghurama Bhyravabhotla, Duluth, GA (US)

(73) Assignee: NCR Corporation, Dayton, OH (US)

( * ) Notice: Subject to any disclaimer, the term of this patent is extended or adjusted under 35 U.S.C. 154(b) by 832 days.

(21) Appl. No.: 09/144,949

(22) Filed: Sep. 1, 1998

(51) Int. Cl.[7] .............................................. G06K 15/00
(52) U.S. Cl. ...................... 235/383; 235/385; 705/20
(58) Field of Search ................................ 235/375, 383, 235/385; 340/825.35; 705/16, 20, 23

(56) References Cited

U.S. PATENT DOCUMENTS

| | | | |
|---|---|---|---|
| 4,002,886 A | | 1/1977 | Sundelin ..................... 235/383 |
| 4,500,880 A | | 2/1985 | Gomersall et al. ...... 340/825.35 |
| 4,924,363 A | | 5/1990 | Kornelson ................... 362/125 |
| 4,959,530 A | * | 9/1990 | O'Connor .................... 235/383 |
| 4,962,466 A | * | 10/1990 | Revesz et al. ...... 340/825.35 X |
| 5,111,196 A | * | 5/1992 | Hunt ....................... 235/383 X |
| 5,172,314 A | | 12/1992 | Poland et al. ................... 705/1 |
| 5,398,191 A | * | 3/1995 | Komai ................... 235/383 X |
| 5,448,226 A | | 9/1995 | Failing, Jr. et al. ..... 340/825.35 |
| 5,537,312 A | | 7/1996 | Sekiguchi et al. |
| 5,838,286 A | * | 11/1998 | Pfeiffer et al. ...... 340/825.35 X |
| 5,898,383 A | * | 4/1999 | Forsythe ................. 340/825.35 |
| 5,933,813 A | * | 8/1999 | Teicher et al. ............ 705/20 X |

FOREIGN PATENT DOCUMENTS

| | | |
|---|---|---|
| EP | 0396414 | 11/1990 |
| EP | 0604382 | 6/1994 |
| EP | 0834854 | 4/1998 |
| WO | WO 92/16901 | 10/1992 |

* cited by examiner

Primary Examiner—Jared J. Fureman
(74) Attorney, Agent, or Firm—Paul W. Martin

(57) ABSTRACT

A system for displaying price information for a random weight item which detects the random weight item and instructs an electronic price label to only display unit price information for the random weight item. The system includes a computer system coupled to the electronic price label, including a terminal and a storage medium coupled to the terminal. The storage medium contains an electronic price label data file, which contains identification information for an item. The computer terminal reads the electronic price label data file to obtain the identification information for the item, determines from the identification information whether the item is the random weight item, and, if the item is the random weight item, sends a message to the electronic price label instructing the electronic price label to display only unit price information.

1 Claim, 3 Drawing Sheets

SYSTEM AND METHOD OF DISPLAYING RANDOM WEIGHT ITEM INFORMATION BY ELECTRONIC PRICE LABELS

BACKGROUND OF THE INVENTION

The present invention relates to electronic price label (EPL) systems, and more specifically to a system and method of displaying random weight item information by EPLs.

EPL systems typically include a plurality of EPLs for each merchandise item in a transaction establishment. EPLs typically display the price of corresponding merchandise items on transaction establishment shelves and are typically attached to a rail along the leading edge of the shelves. A transaction establishment may contain thousands of EPLs to display the prices of the merchandise items. The EPLs are coupled to a central server from where information about the EPLs is typically maintained in an EPL data file. Price information displayed by the EPLs is obtained from a price look-up (PLU) file.

Some merchandise items vary in price based upon their weight. Such merchandise items may either be weighed and priced in the transaction establishment, or weighed and priced by the suppliers. In the latter case, suppliers typically embed total price information in a product identification code, such as a bar code. For example, an EAN (formerly European Article Number, now International Article Number) product identification code contains a random weight price if the first two characters are between twenty and twenty-nine. A UPC (Universal Product Code) product identification code contains a random weight price if the NSC (Number System Character—the first character of a scannable bar code) code is '2'.

A good example is a pre-wrapped package of steaks. The package has a bar code label which contains a human-readable price and also a bar code. The bar code begins with a '2' followed by a few numbers identifying the product, and then the price. When a bar code reader reads the bar code, it strips out the price.

Since many random weight items having different total prices may be located together on a store shelf, total price information displayed by an EPL associated with such items would be unreliable.

Therefore, it would be desirable to provide a system and method of displaying information about random weight items which identifies random weight items and instructs associated EPLs to either leave a total price display area blank or display other information instead.

SUMMARY OF THE INVENTION

In accordance with the teachings of the present invention, a system and method of displaying random weight item information by electronic price labels (EPL) is provided.

The system includes a computer system coupled to the electronic price label, including a terminal and a storage medium coupled to the terminal. The storage medium contains an electronic price label data file, which contains identification information for an item. The computer terminal reads the electronic price label data file to obtain the identification information for the item, determines from the identification information whether the item is the random weight item, and, if the item is the random weight item, sends a message to the electronic price label instructing the electronic price label to display only unit price information.

The method includes the steps of reading an electronic price label data file to obtain identification information for an item associated with the electronic price label, determining from the identification information whether the item is the random weight item, and, if the item is the random weight item, sending a message to the electronic price label instructing the electronic price label to display only unit price information.

In a first embodiment, the computer sends a message to the electronic price label instructing the electronic price label to display the unit price information in a unit price portion of a display within the electronic price label and to clear a total price portion of the display.

In a first embodiment, the computer sends a message to the electronic price label instructing the electronic price label to display the unit price information in a unit price portion and in a total price portion of a display within the electronic price label.

It is accordingly an object of the present invention to provide a system and method of displaying random weight item information by EPLs.

It is another object of the present invention to provide a system and method of displaying random weight item information by EPLs which detects random weight item information.

It is another object of the present invention to provide a system and method of displaying random weight item information by EPLs which displays price information including only a unit price for a random weight item.

It is another object of the present invention to provide a system and method of displaying random weight item information by EPLs which displays a unit price for a random weight item in both a unit price portion and a total price portion.

It is another object of the present invention to provide a system and method of displaying random weight item information by EPLs which displays a unit price for a random weight item in a unit price portion and clears a total price portion of the EPL.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
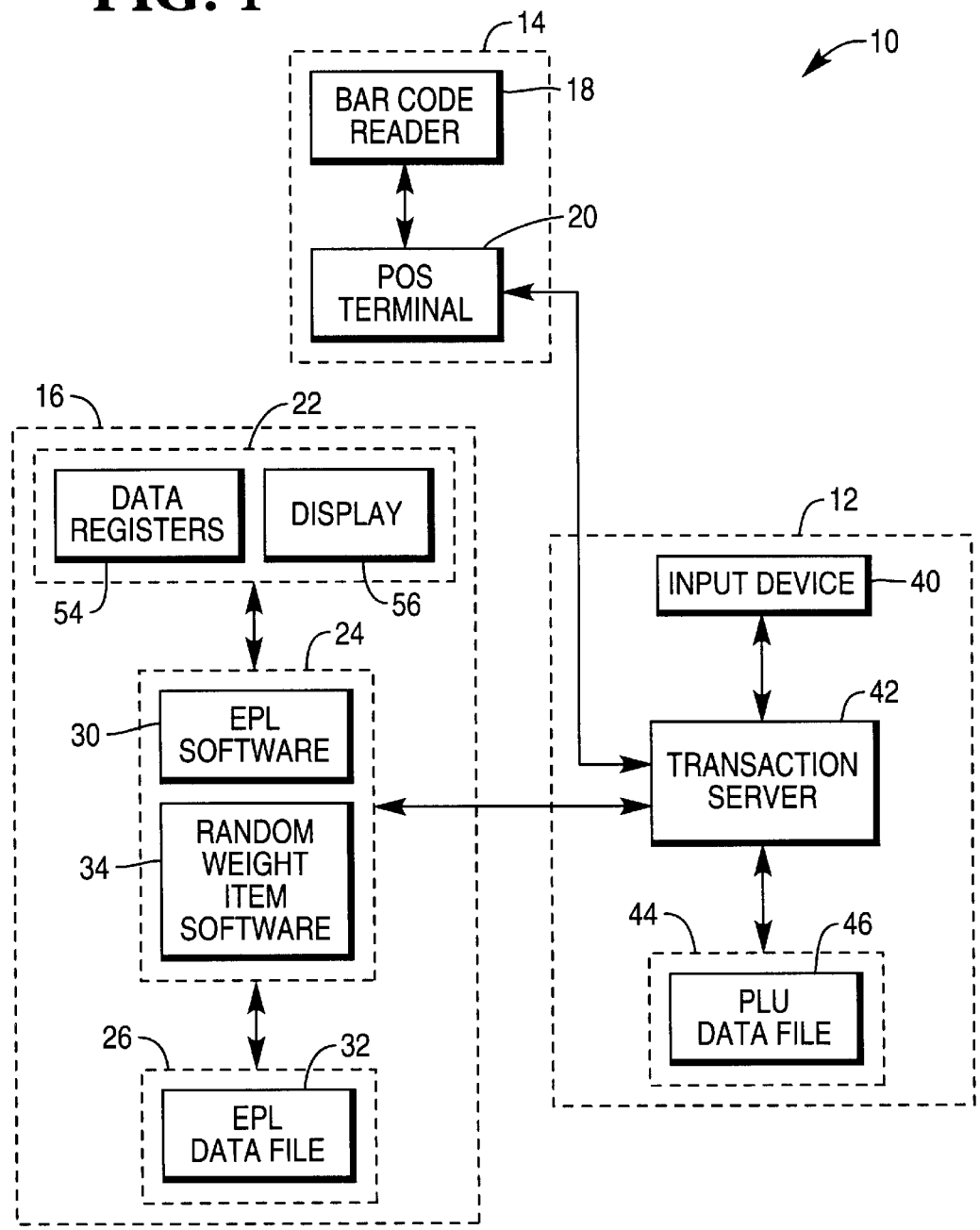
FIG. 1 is a block diagram of transaction system including an EPL system.

Referring now to FIG. 1, transaction system 10 primarily includes host computer system 12, point-of-sale (POS) system 14, and EPL system 16. Here, components 12 and 14 are shown as separate components that are networked together, but they may also form a single component. Thus, host computer system 12 may be a POS terminal which doubles as a host computer for network of other POS terminals.

POS system 14 includes bar code reader 18 and terminal 20.

EPL system 16 primarily includes EPLs 22, host EPL terminal 24, and EPL storage medium 26.

EPLs 22 include a data registers 54 and a display 56. Data registers 54 contain data, usually price data and promotional data, sent from EPL software 30. The data is displayed by displays 56.

Host EPL terminal 24 executes EPL software 30. To assist with execution of certain tasks performed by EPL software 30, EPL terminal 24 includes a built-in time keeping device, commonly referred to as a system clock, which is synchronized with current time, in order to automatically execute the tasks at their scheduled times.

EPL software 30 is responsible for scheduling and transmitting messages to EPLs 22. The messages may contain price and promotional data from price look-up (PLU) file 46. EPL software 30 obtains prices and promotional data in PLU data file 46 as they are entered using input device 40 (immediate processing) or after they have been stored within PLU data file 46.

EPL terminal 24 also executes EPL random weight item software 34. EPL random weight item software 34 identifies random weight items and instructs associated EPLs to either leave a total price display area blank or display the unit price in the total price display area in addition to the unit price display area.

EPL storage medium 26 stores EPL data file 32. EPL storage medium 26 and is preferably a fixed disk drive.

EPL data file 32 contains EPL identification information and checksum information. Checksum may be price checksum information calculated from a corresponding price in PLU data file 46 and/or promotional data in PLU data file 46. EPL data file 32 contains information currently displayed by EPLs 22. EPL data file 32 additional includes flags indicating whether to display promotional messages for random weight items. Promotional messages may be stored in one or more data files, including EPL data file 32 and/or PLU data file 46.

Host computer system 12 includes PLU storage medium 44, transaction server 42, and input device 40.

Transaction server 42 handles price requests from POS terminal 20 and EPL system 16. POS terminal 20 sends item identification information to transaction server 42 and transaction server 42 returns the corresponding price from PLU data file 46. EPL system 16 obtains prices from PLU data file 46 and promotional data from PLU data file 46 or some other source.

PLU storage medium 44 stores PLU data file 46. PLU data file 46 is available for distribution to POS terminal 20 and EPL system 16. Provision may be made for direct access to PLU data file 46 by bar code reader 18 or EPL terminal 24.

Figure 2:
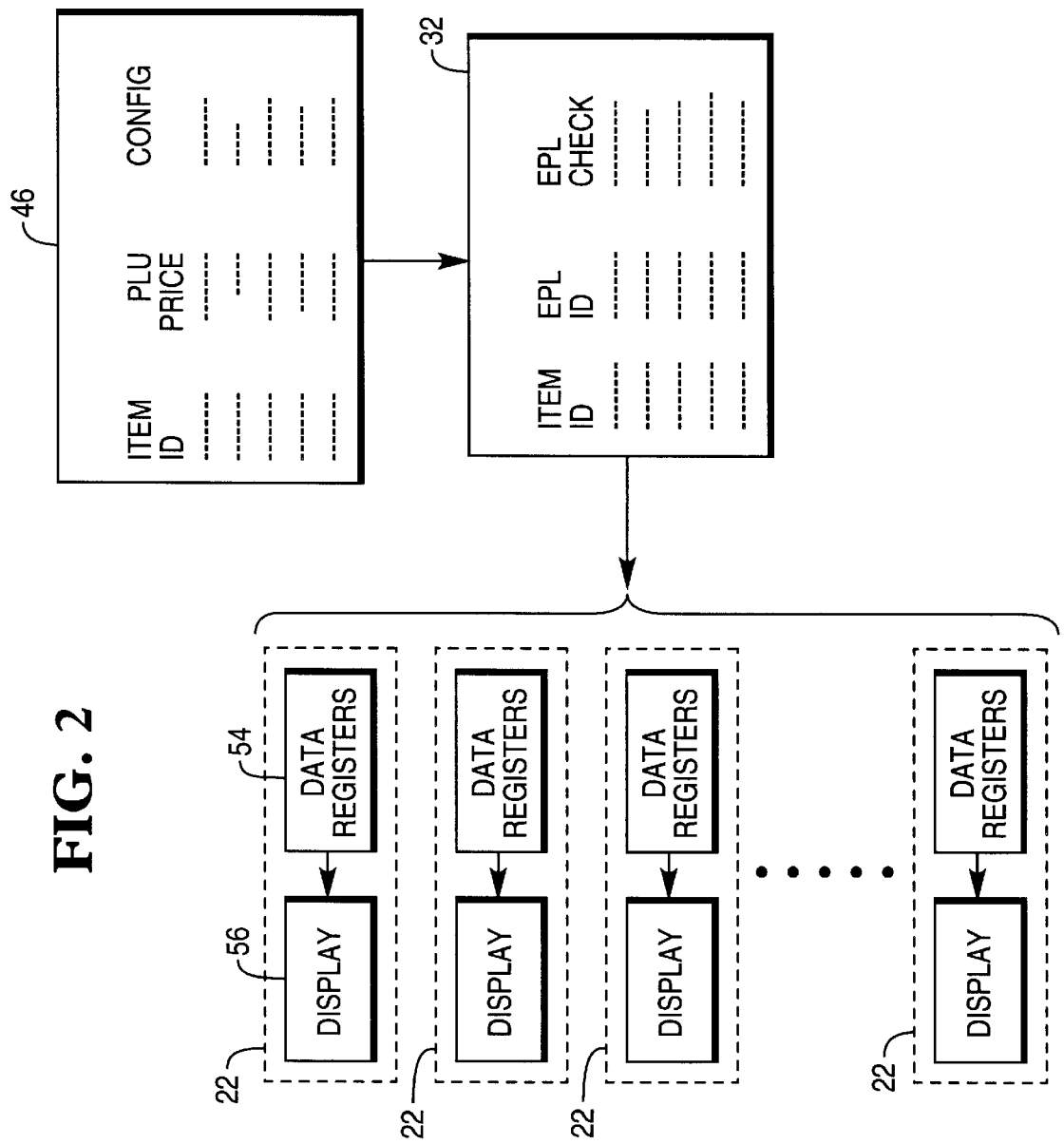
FIG. 2 is a diagram showing data files used within a transaction establishment.

Turning now to FIG. 2, EPL data file 32 and PLU data file 46 are shown in more detail.

EPL data file 32 includes a line entry for each EPL 22 in EPL system 16. Each line entry has an item identification entry (ITEM ID), an EPL identification entry (EPL ID), and an EPL checksum value entry (EPL CHECK). EPL data file 32 may include additional data as necessary to manage EPLs 22, such as an entry CONFIG.

Entry ITEM ID identifies a store item. Entry EPL ID identifies which EPL is assigned to the item. Entry EPL CHECK is a checksum value of the prices within data registers 54. Entry CONFIG is a configuration option which allows a retailer to display unit price information in the total price portion of EPL 22.

PLU data file 46 includes a line entry for each item sold in the transaction establishment. Each line entry has at least an item identification entry (ITEM ID) and a PLU price entry (PLU PRICE).

Entry ITEM ID identifies a store item. Entry PLU PRICE identifies the price read by POS system 14 to determine the price of each item during scanning by bar code reader 18.

During normal operation, EPL random weight item software 34 reads EPL data file 32 for item identification information and identifies random weight items from the item identification information. EPL random weight item software 34 reads EPL data file 32 to determine whether to display the unit price in the total price display area or leave it blank for random weight items. EPL random weight item software 34 works through EPL software 30 to send instruction messages to associated EPLs. Such instruction messages command the associated EPLs to display the unit prices and to leave a total price display area blank or display the unit price in the total price display area.

Figure 3:
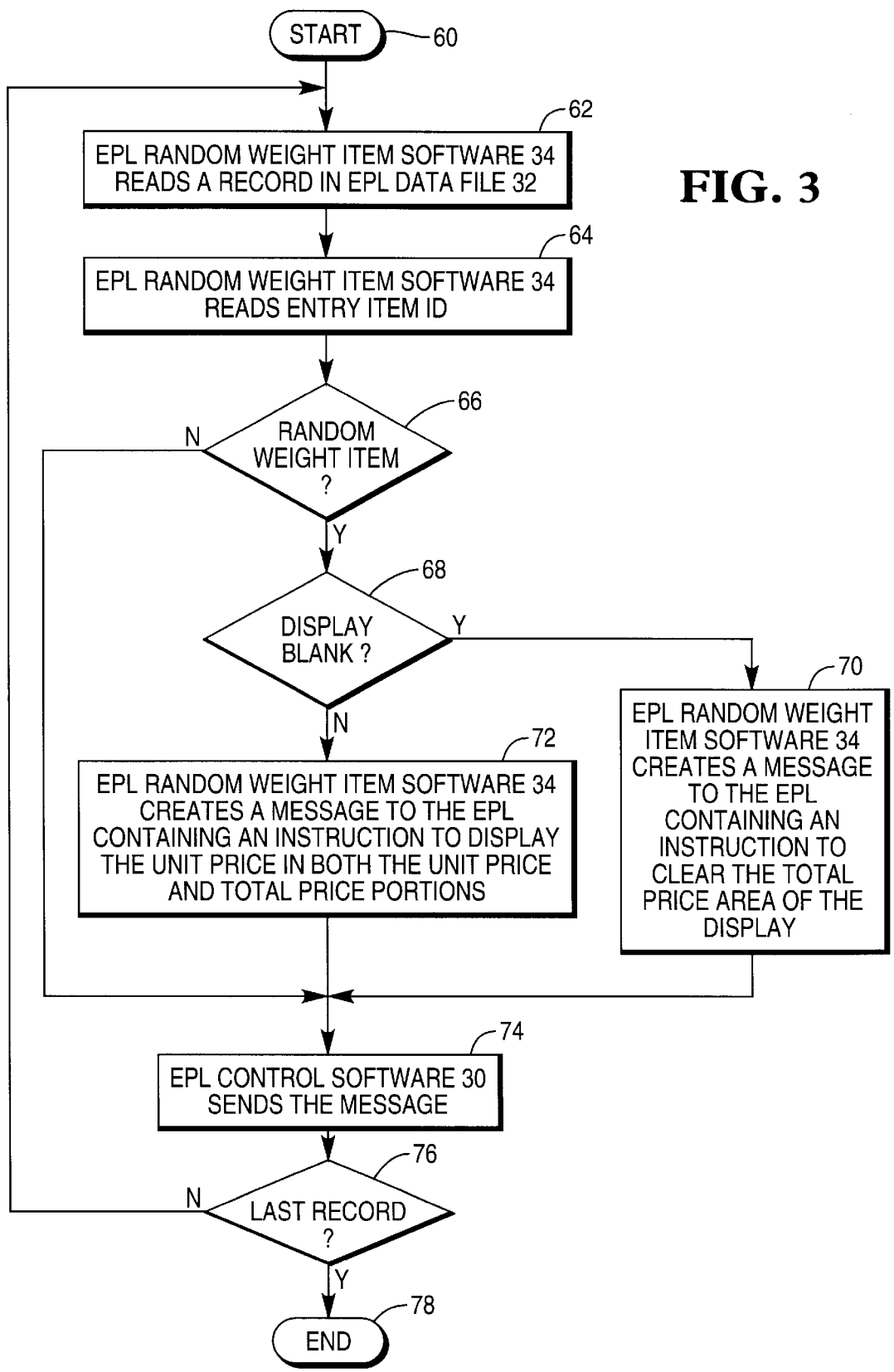
FIG. 3 is a flow diagram illustrating the method of the present invention.

Turning now to FIG. 3, the operation of EPL random weight item software 34 is illustrated in more detail beginning with START 60.

In step 62, EPL random weight item software 34 reads a record in EPL data file 32.

In step 64, EPL random weight item software 34 reads entry ITEM ID.

In step 66, EPL random weight item software 34 determines whether the item associated with entry ITEM ID is a random weight item. If so, operation proceeds to step 68. If not, operation proceeds to step 74. In the latter case, EPL random weight item software 34 does not modify the operation of the EPL, thus allowing unit and total prices to be displayed together.

In step 68, EPL random weight item software 34 reads entry CONFIG in EPL data file 32 to determine whether the total price portion of display 56 should contain the unit price or be left blank. If entry CONFIG indicates that unit price should not be displayed, operation proceeds to step 70. Otherwise, operation proceeds to step 72.

In step 70, EPL random weight item software 34 creates a message containing an instruction to clear the total price area of the display. Operation proceeds to step 74.

In step 72, EPL random weight item software 34 creates a message containing an instruction to display the unit price in both the unit price and total price portions of display 56. Operation proceeds to step 74.

In step 74, EPL control software 30 sends the message to the EPL.

In step 76, EPL random weight item software 34 determines whether the last record of EPL data file 32 has been read. If so, the method ends at step 78. If not, the method returns to step 62 to read another line entry from EPL data file 32.

Although the present invention has been described with particular reference to certain preferred embodiments thereof, variations and modifications of the present invention can be effected within the spirit and scope of the following claims.

We claim:

1. A method of displaying price information for a random weight item comprising the steps of:

(a) reading an electronic price label data file to obtain identification information for an item associated with the electronic price label;
(b) determining from the identification information whether the item is the random weight item; and
(c) if the item is the random weight item, sending a message to the electronic price label instructing the electronic price label to display only unit price information;

wherein step (c) comprises the substep of:
(c-1) sending a message to the electronic price label instructing the electronic price label to display the unit price information in a unit price portion and in a total price portion of a display within the electronic price label.

* * * * *